(12) United States Patent
Handa

(10) Patent No.: US 8,507,060 B2
(45) Date of Patent: Aug. 13, 2013

(54) PRESSURE VESSEL

(75) Inventor: Kiyoshi Handa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/160,484

(22) Filed: Jun. 14, 2011

(65) Prior Publication Data

US 2011/0303662 A1   Dec. 15, 2011

(30) Foreign Application Priority Data

Jun. 15, 2010   (JP) ................................. 2010-136158

(51) Int. Cl.
*B65D 1/40*   (2006.01)

(52) U.S. Cl.
USPC ....... 428/35.7; 428/36.3; 428/36.4; 428/36.5; 220/581

(58) Field of Classification Search
USPC ...... 428/35.7, 36.3, 36.4, 36.5; 220/581–592
See application file for complete search history.

(56) References Cited

U.S. PATENT DOCUMENTS

| | | |
|---|---|---|
| 5,476,189 A | 12/1995 | Duvall et al. |
| 6,190,481 B1 * | 2/2001 | Iida et al. ...................... 156/175 |
| 6,613,391 B1 * | 9/2003 | Gang ............................ 427/415 |
| 6,957,542 B1 | 10/2005 | Kido et al. |
| 2004/0009315 A1 * | 1/2004 | Potter et al. .................. 428/35.7 |
| 2010/0144226 A1 | 6/2010 | Guenthner et al. |

FOREIGN PATENT DOCUMENTS

| | | |
|---|---|---|
| JP | 05-131583 | 5/1993 |
| JP | 07-259445 | 10/1995 |
| JP | 08-35598 | 2/1996 |
| JP | 08-035598 | 2/1996 |
| JP | 2001-130271 | 5/2001 |
| JP | 2001-130272 | 5/2001 |

OTHER PUBLICATIONS

Japanese Office Action for corresponding JP Application No. 2010-136158, Jul. 3, 2012.
Japanese Office Action for corresponding JP Application No. 2010-136158, Apr. 24, 2012.

* cited by examiner

*Primary Examiner* — Ellen S Raudenbush
*Assistant Examiner* — Yan Lan
(74) *Attorney, Agent, or Firm* — Ditthavong Mori & Steiner, P.C.

(57) ABSTRACT

A pressure vessel includes a liner, a reinforcing layer, and a protective layer. An inside of the liner forms a reserving chamber. The reinforcing layer is made of fiber reinforced plastic and is provided on an outer surface of the liner. A protective layer is provided on an outer surface of the reinforcing layer and includes fiber materials and a thermally foamed material. The thermally foamed material is interposed between the fiber materials.

8 Claims, 3 Drawing Sheets

PRESSURE VESSEL

CROSS-REFERENCE TO RELATED APPLICATIONS

The present application claims priority under 35 U.S.C. §119 to Japanese Patent Application No. 2010-136158, filed Jun. 15, 2010. The contents of this application are incorporated herein by reference in their entirety.

BACKGROUND OF THE INVENTION

1. Field of the Invention

The present invention relates to a pressure vessel.

2. Discussion of the Background

A fuel cell vehicle which is equipped with a fuel cell and is operated using electricity generated by the fuel cell as an energy source, has a hydrogen tank (pressure vessel) which supplies hydrogen (fuel) to the fuel cell, a compressor which supplies air including oxygen as an oxidant to the fuel cell, a coolant pump which delivers a coolant circulated in the fuel cell, a PDU (power drive unit) which converts direct-current electricity to alternating-current electricity, a motor for driving, and a drive train which transmits the driving force of the motor to a driving wheel. Here, external devices such as the compressor, the coolant pump, the PDU, and the drive train generate heat with their operation.

The hydrogen tank is filled with hydrogen at high pressure. A hydrogen supply passage which supplies hydrogen from the hydrogen tank to the fuel cell has a pressure reducing valve. The target pressure of hydrogen is set according to required electricity calculated based on an accelerator opening. The pressure reducing valve is controlled so that the secondary side pressure of the pressure reducing valve can be the target pressure.

Unlike hydrogen (gas) filled into such hydrogen tank, a fuel tank which reserves a liquid fuel (gasoline), the fuel tank having a multilayered tank configuration to prevent fuel vapor occurrence due to heat input and incorporating a heat radiation means thereinto, has been proposed (see Japanese Patent Application Laid-Open (JP-A) No. 2001-130271).

SUMMARY OF THE INVENTION

According to one aspect of the present invention, a pressure vessel includes a liner, a reinforcing layer, and a protective layer. An inside of the liner forms a reserving chamber. The reinforcing layer is made of fiber reinforced plastic and is provided on an outer surface of the liner. A protective layer is provided on an outer surface of the reinforcing layer and includes fiber materials and a thermally foamed material. The thermally foamed material is interposed between the fiber materials.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
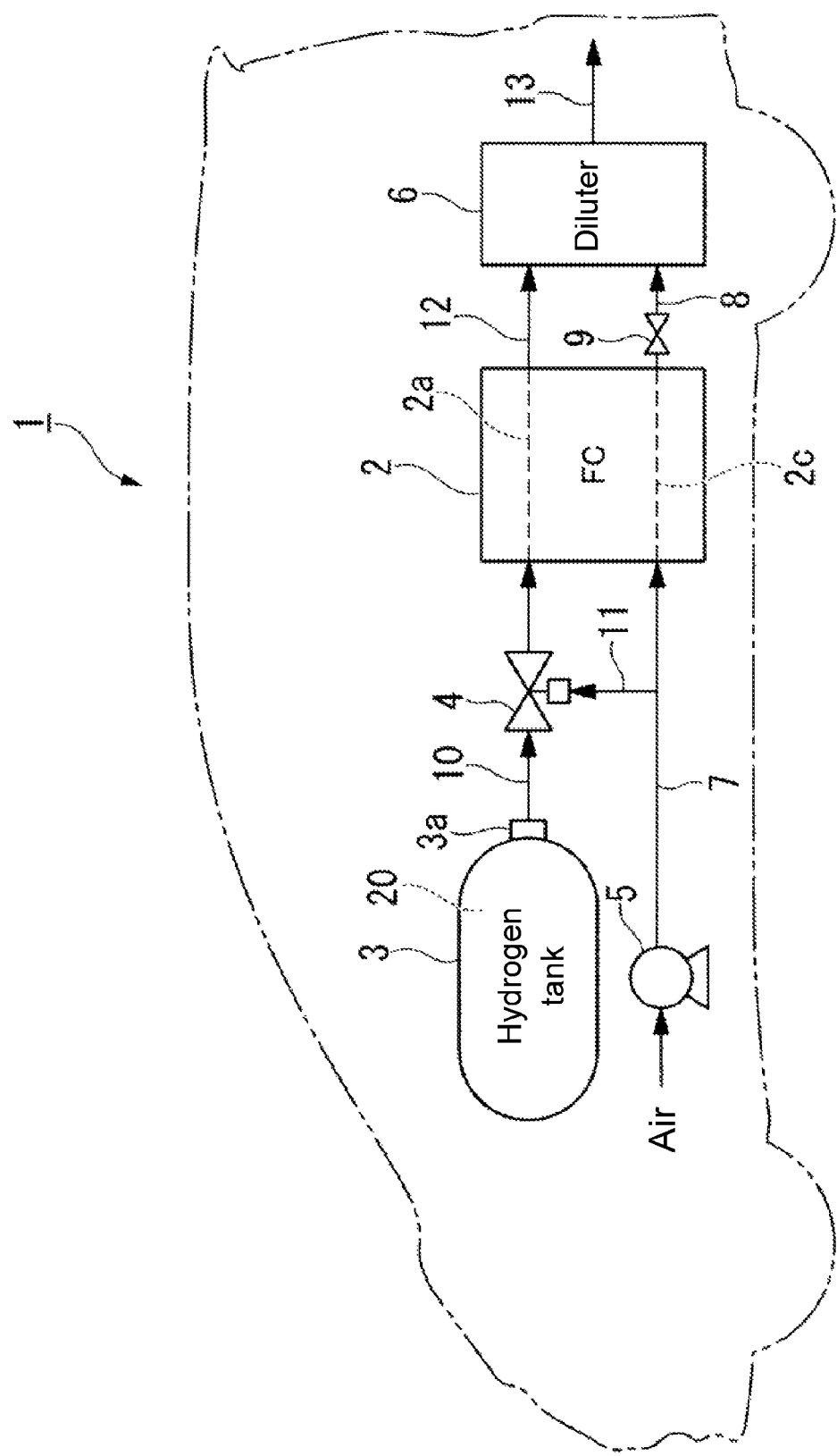
FIG. 1 is a schematic block diagram of a fuel cell vehicle having a hydrogen tank as a pressure vessel according to an embodiment of the present invention.

The embodiments will be described with reference to FIGS. 1 to 4, wherein like reference numerals designate corresponding or identical elements throughout the various drawings. Further, in this embodiment, the pressure vessel according to the embodiment of the present invention is applied to a hydrogen tank (fuel tank) installed in a fuel cell vehicle.

FIG. 1 is a diagram showing the schematic configuration of a fuel cell vehicle. A fuel cell vehicle 1 has a fuel cell stack (fuel cell) 2 which is supplied with hydrogen as a fuel and oxygen as an oxidant to generate electricity, a hydrogen tank (pressure vessel) 3 which reserves hydrogen at high pressure, a pressure reducing valve 4 which pressure-reduces the hydrogen at high pressure released from the hydrogen tank 3, a compressor 5 which supplies air including oxygen to the fuel cell stack 2, and a diluter 6.

The fuel cell stack 2 is a polymer electrolyte fuel cell: PEFC, and has plural stacked unit cells in which an MEA (membrane electrode assembly) is sandwiched between separators (not shown). The MEA has an electrolyte membrane (polymer electrolyte), and a cathode and an anode which sandwich the electrolyte membrane. The separators are formed with an anode passage 2a and a cathode passage 2c, which have a groove and a through-hole.

Air is pressurized to a predetermined pressure by the compressor 5, and is supplied through an air supply passage 7 to the cathode passage 2c of the fuel cell stack 2. The air supplied to the cathode passage 2c is provided for electricity generation, is discharged as an air off gas from the fuel cell stack 2, and is discharged through an air discharge passage 8 to the diluter 6. Further, the compressor 5 uses the fuel cell stack 2 and a high-pressure battery (not shown) which charges electricity generated by the fuel cell stack 2 as a power source.

The air discharge passage 8 has a back pressure valve 9 for adjusting the air pressure of the cathode passage 2c of the fuel cell stack 2.

An electronic controller, not shown, calculates required electricity, a target air pressure, and a target hydrogen pressure based on an accelerator opening, and controls the opening of the back pressure valve 9 and the rotational speed of the compressor 5 so as to provide the target air pressure.

On the other hand, hydrogen is reserved at high pressure in the hydrogen tank 3, and the hydrogen released from the hydrogen tank 3 passes through a hydrogen supply passage 10, is pressure-reduced by the pressure reducing valve 4 provided in the hydrogen supply passage 10, and is supplied to the anode passage 2a of the fuel cell stack 2. The pressure reducing valve 4 uses the pressure of air inputted from the air supply passage 7 via a lead pipe 11 (that is, cathode pressure) as a signal pressure, and pressure-reduces the hydrogen at high pressure supplied from the hydrogen tank 3 so as to have a pressure higher than the signal pressure by a predetermined pressure. Thereby, the anode-cathode pressure difference between the cathode and the anode of the fuel cell stack 2 is held to a predetermined pressure.

The unreacted hydrogen which has not been consumed in the fuel cell stack 2 is discharged as a hydrogen off gas from the fuel cell stack 2, and is discharged through the hydrogen off gas passage 12 to the diluter 6. The hydrogen off gas is mixed with the air off gas so as to be diluted in the diluter 6. The mixed gas is discharged from the diluter 6 via an exhaust pipe 13 to the outside.

The compressor 5 is a heat source which generates heat when operated. In this embodiment, part of heat generated by the compressor 5 is transmitted to the hydrogen tank 3. The hydrogen tank 3 receives the heat generated by the compressor 5. When the heat is transmitted to the inside of the hydrogen tank 3, hydrogen reserved in the hydrogen tank 3 is expanded to increase the pressure of the hydrogen. Accordingly, the hydrogen tank 3 of this embodiment adopts a configuration in which even when the hydrogen tank 3 receives heat from the outside, the heat is hard to be transmitted to the inside. Further, various heat sources which provide heat to the hydrogen tank 3 can include an electronic controller, a coolant pump, a high pressure battery, a PDU, and a drive train in addition to the compressor 5.

Hereinafter, the configuration of the hydrogen tank 3 will be described.

As shown in FIG. 1, the hydrogen tank 3 has a substantially cylindrical shape, and is installed in the fuel cell vehicle 1 so that its longitudinal direction (axial direction) is horizontal. A pressure relief valve (not shown) is incorporated into a connector 3a of the hydrogen tank 3.

Figure 2:
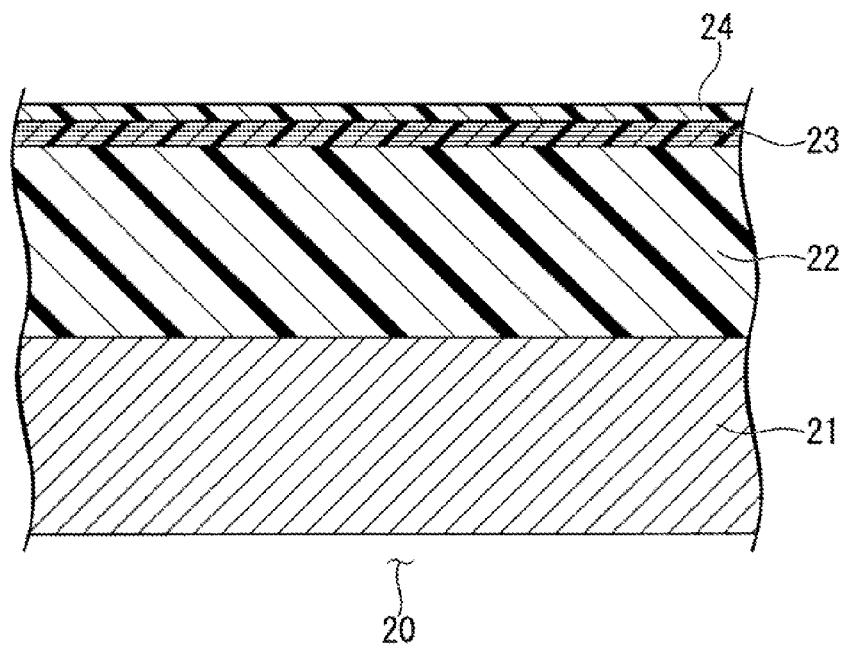
FIG. 2 is a diagram showing the cross section of part of the pressure vessel before heat reception.

FIG. 2 shows a breakaway view of part of the peripheral wall portion of the hydrogen tank 3. The hydrogen tank 3 has a liner 21 made of an aluminum alloy in a substantially cylindrical shape and configuring an innermost wall portion in which its inside becomes a hydrogen reserving chamber 20, a reinforcing layer 22 formed on an outer surface of the liner 21 so as to cover the liner 21, a protective layer 23 formed on an outer surface of the reinforcing layer 22 so as to cover the reinforcing layer 22, and a water-proof layer 24 formed on an outer surface of the protective layer 23 so as to cover the protective layer 23.

The reinforcing layer 22 reinforces the liner 21 to increase the mechanical strength, and is configured of carbon fiber reinforced plastic (hereinafter, abbreviated as CFRP) as an example among various fiber reinforced plastics. For instance, the reinforcing layer 22 can be formed by winding long carbon fibers impregnated with thermosetting resin around the liner 21 in a predetermined manner, and curing the thermosetting resin.

The protective layer 23 prevents the reinforcing layer 22 from being damaged, and at the time of heat reception, forms a heat insulation layer to allow heat to be hard to be transmitted to the inside.

For instance, the protective layer 23 can be formed by immersing the bundle of long glass fibers with a thermally foamed resin solution made by dissolving thermally foamed resin in water to impregnate the glass fibers with the thermally foamed resin solution, and winding, drying, and solidifying the glass fibers along the outer surface of the reinforcing layer 22 in the circumferential direction. Further, the thermally foamed resin can be a known thermally foamed heat insulation coating material including a foaming agent such as ammonium phosphate.

Figure 3:
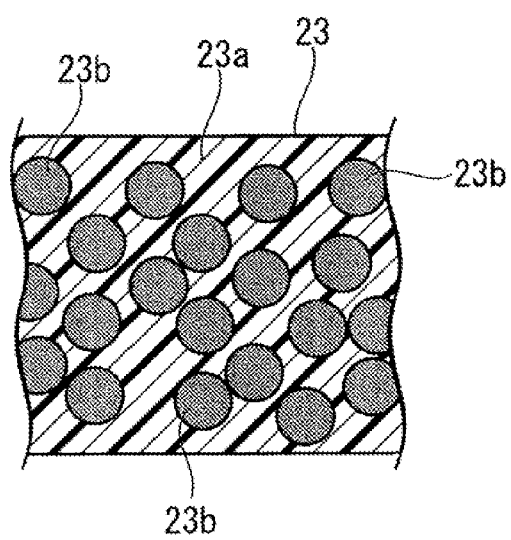
FIG. 3 is a cross-sectional view of a protective layer before foaming.

FIG. 3 is a cross-sectional view of the protective layer 23 formed in this manner, in which a large number of glass fibers (fiber materials) 23b are spacedly arranged to a thermally foamed resin layer (thermally foamed material) 23a. In other words, the thermally foamed resin layer 23a is interposed between the glass fibers 23b.

The thermally foamed resin is softened when it becomes hot by being heated from the outside. When the foaming agent reaches the foaming temperature, the thermally foamed resin generates gas so as to be foamed, and forms a large number of bubbles therein so as to be expanded. Further, the temperature at which the thermally foamed resin is foamed is determined according to the foaming temperature of the foaming agent, so that the temperature can be set to a desired temperature by changing the foaming agent.

The water-proof layer 24 provides water resistance to the protective layer 23, and can be configured of, e.g., urethane resin.

According to the hydrogen tank 3 configured in this manner, the following operation effect can be obtained.

The protective layer 23 is provided outside the reinforcing layer 22, so that even when a small stone or the like is hit onto the hydrogen tank 3, the reinforcing layer 22 is protected by the protective layer 3. Therefore, a small stone or the like cannot be directly hit onto the reinforcing layer 22, whereby the reinforcing layer 22 cannot be damaged.

The water-proof layer 24 is provided outside the protective layer 23, so that even when the hydrogen tank 3 gets wet with rain, the water is blocked by the water-proof layer 24 and cannot enter the protective layer 23. As a result, the protective layer 23 having the water-soluble thermally foamed resin layer 23a can be held into a proper state over a long time.

Figure 4:
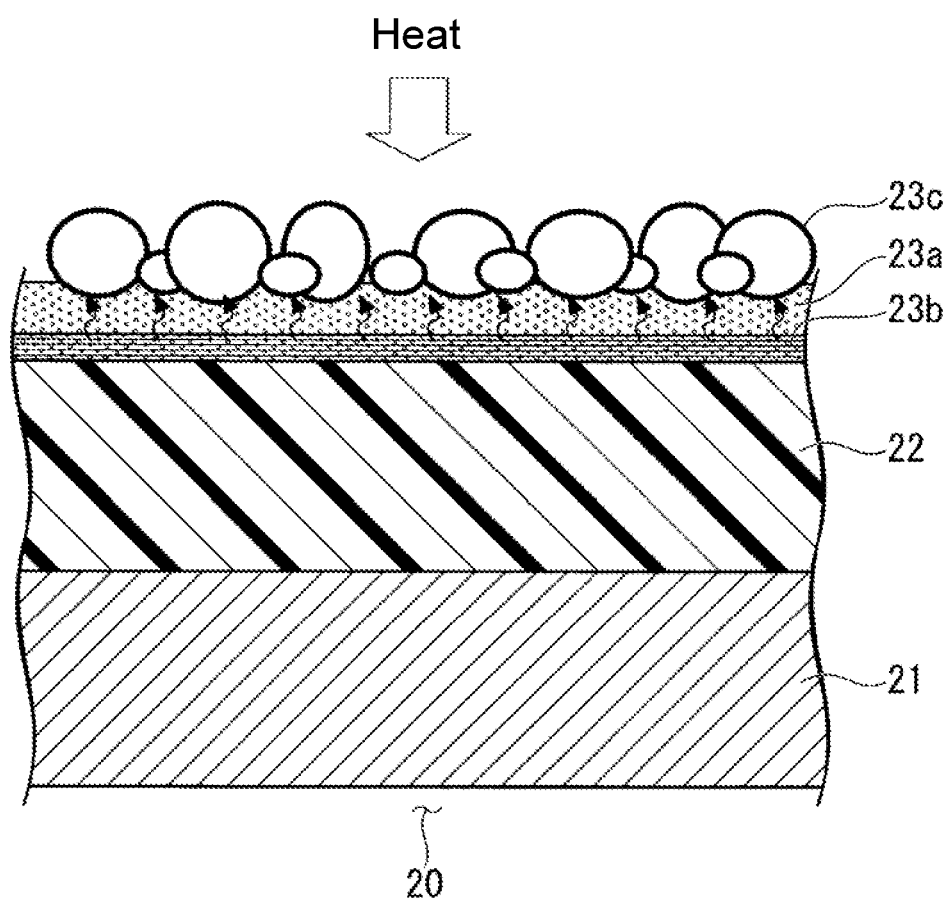
FIG. 4 is a cross-sectional view corresponding to FIG. 2 and showing the state that the thermally foamed material of the protective layer is foamed.

When the compressor 5 generates heat by its operation, the heat is transmitted to the hydrogen tank 3. Then, the temperature of the thermally foamed resin layer 23a of the protective layer 23 is increased to the predetermined foaming temperature. As a result, the thermally foamed resin layer 23a is softened, foamed, and expanded. As shown in FIG. 4, the glass fibers 23b are left where they are, so that only the thermally foamed resin layer 23a is swelled upward from the glass fibers 23b. A heat insulation layer 23c having bubbles is formed on the upper portion of the thermally foamed resin layer 23a.

Thereby, a surface of the portion of the hydrogen tank 3 which receives heat from the compressor 5 is covered with the heat insulation layer 23c, which insulates the heat generated by the compressor 5. The heat is hard to be transmitted to the inside (the direction approaching the liner 21), so that the amount of heat inputted into the reserving chamber 20 can be reduced. As a result, the temperature of hydrogen filled in the liner 21 is also hard to be increased, thereby enabling the hydrogen to be prevented from being expanded, so that the pressure increase of the hydrogen can be prevented.

Therefore, the increase of the primary side pressure of the pressure reducing valve 4 shown in FIG. 1 due to the influence of heat generation of the compressor 5 can be prevented.

Accordingly, the control range of the pressure reducing valve 4 is not required to be wide, so that the fuel cell vehicle 1 can be manufactured at low cost. The pressure reducing valve 4 can pressure-reduce and regulate hydrogen to an appropriate pressure to supply the hydrogen at an appropriate pressure to the anode passage 2a, so that deterioration of the fuel cell stack 2 due to excessive hydrogen supply can be prevented. In addition, since excessive hydrogen supply is eliminated, the amount of hydrogen discharged from the fuel cell stack 2 without being consumed cannot be increased. The fuel consumption rate (hydrogen consumption efficiency) of the fuel cell vehicle 1 can be prevented from being lowered.

Further, when the entire outer circumference surface of the hydrogen tank 3 receives heat to increase the thermally foamed resin layer 23a of the entire protective layer 23 to the foaming temperature, the heat insulation layer 23c is formed on the entire outer circumference of the hydrogen tank 3.

When directly coated onto the outer circumference surface of the reinforcing layer 22 without having the glass fibers 23b, the thermally foamed resin solution is dripped before being solidified. Therefore, the film thickness of the thermally foamed resin layer which can be formed by one coating is reduced, so that plural coatings are required to obtain a predetermined film thickness, with the result that the number of steps is increased to lower the productivity. In addition, when the film thickness of the thermally foamed resin is non-uniform, a predetermined film thickness is secured by the portion with the smallest film thickness, so that on the whole, the film thickness is required to be increased.

On the contrary, the protective layer 23 of this embodiment is formed by impregnating the glass fibers 23b with the thermally foamed resin solution, and winding, drying, and solidifying the glass fibers 23b along the outer surface of the reinforcing layer 22 in the circumference direction. Therefore, until solidification, the thermally foamed resin solution can be held between the glass fibers 23b, so that the thermally foamed resin solution cannot be dripped during forming of the protective layer 23. As a result, the thermally foamed resin layer 23a can be interposed between the glass fibers 23b, so that the film thickness of the thermally foamed resin layer 23a of the protective layer 23 can be uniformly formed to a predetermined thickness. In addition, the film thickness can be uniform, so that the film thickness of the thermally foamed resin layer 23a can be reduced. As a result, the hydrogen tank 3 can be lightweight. Besides, the number of steps can be reduced to improve the productivity.

In addition, the protective layer 23 interposes the thermally foamed resin layer 23a between the glass fibers 23b. At the time of shock, the thermally foamed resin layer 23a can be prevented from being fallen.

Further, in the hydrogen tank 3 of this embodiment, the diameter of the liner 21 can be 50 to 70 cm, the thickness of the reinforcing layer 21 can be 10 to 100 mm, the thickness of the protective layer 22 can be 0.05 to 5 mm, the thickness of the water-proof layer 24 can be 0.05 to 5 μm, and the diameter of the glass fiber 23b of the protective layer 23 can be 1 to 50 μm.

Other Embodiments

Further, the present invention is not limited to the above embodiment.

For instance, although in the above embodiment, the fiber materials of the protective layer 23 are made of glass fibers, they are not limited to this and may be carbon fibers.

In addition, the thermally foamed resin layer 23a of the protective layer 23 is not required to be water-soluble, and oily one may be appropriately selected.

Further, although in the above embodiment, the substance reserved in the reserving chamber of the pressure vessel is hydrogen, it is not limited to hydrogen and may be oxygen, nitrogen, and natural gas (methane).

Furthermore, although in the above embodiment, the fuel tank installed in the fuel cell vehicle is the hydrogen tank, the target in which the fuel tank is installed is not limited to a vehicle, and may be a ship or an aircraft or may be a stationary type used so as to be fixed onto the ground. In addition, the pressure vessel is not limited to the fuel tank.

According to the embodiment of the present invention, when the pressure vessel receives heat from the outside, the thermally foamed material of the protective layer is foamed so as to be a heat insulation material, thereby enabling the amount of heat inputted into the reserving chamber to be decreased, so that the internal pressure in the reserving chamber can be prevented from being increased.

In addition, the protective layer interposes the thermally foamed material between the fiber materials, so that the thermally foamed material can be substantially uniformly stacked on an outer surface of the reinforcing layer. The uniformed film thickness of the thermally foamed material can reduce the film thickness, so that the pressure vessel can be lightweight and compact.

Further, after the protective layer is formed, the fiber materials can prevent the thermally foamed material from being fallen.

According to the embodiment of the present invention, when the protective layer is formed on the outer surface of the reinforcing layer, the thermally foamed material can be prevented from being dripped, so that the film thickness of the thermally foamed material can be secured to a predetermined thickness.

According to the embodiment of the present invention, the water resistance to the protective layer can be improved.

Obviously, numerous modifications and variations of the present invention are possible in light of the above teachings. It is therefore to be understood that within the scope of the appended claims, the invention may be practiced otherwise than as specifically described herein.

What is claimed is:

1. A pressure vessel comprising:
a liner an inside of which forms a reserving chamber;
a reinforcing layer made of fiber reinforced plastic and provided on an outer surface of the liner; and
a protective layer provided on an outer surface of the reinforcing layer, the protecting layer comprising:
fiber materials impregnated by a thermally foamed material interposed between the fiber materials,
wherein the impregnated fiber materials are wound along the outer surface of the reinforcing layer in a circumferential direction of the liner, and
wherein the protective layer includes a heat insulation layer having bubbles and no fiber materials provided at an outer surface portion of the protective layer.

2. The pressure vessel according to claim 1, further comprising:
a water-proof layer provided on an outer surface of the protective layer.

3. The pressure vessel according to claim 2,
wherein the water-proof layer is urethane resin.

4. The pressure vessel according to claim 1,
wherein the thermally foamed material is thermally foamed resin.

5. The pressure vessel according to claim 4,
wherein the thermally foamed resin is a thermally foamed heat insulating coating material including a foaming agent.

6. The pressure vessel according to claim 5,
wherein the foaming agent is ammonium phosphate.

7. The pressure vessel according to claim 1,
wherein the fiber reinforced plastic of the reinforcing layer comprises carbon fibers impregnated with thermosetting resin.

8. The pressure vessel according to claim 1,
wherein the fiber materials of the protective layer comprises glass fibers.

* * * * *